(12) United States Patent
Haddjeri et al.

(10) Patent No.: US 8,109,732 B2
(45) Date of Patent: Feb. 7, 2012

(54) HORIZONTAL-AXIS WIND GENERATOR

(75) Inventors: Nordine Haddjeri, Marseilles (FR);
Ocine Hayane, Martigues Carro (FR)

(73) Assignee: Nheolis (SARL), Marseilles (FR)

( * ) Notice: Subject to any disclaimer, the term of this patent is extended or adjusted under 35 U.S.C. 154(b) by 806 days.

(21) Appl. No.: 12/160,785

(22) PCT Filed: Jan. 12, 2006

(86) PCT No.: PCT/FR2006/000068
§ 371 (c)(1),
(2), (4) Date: Jul. 12, 2008

(87) PCT Pub. No.: WO2007/080234
PCT Pub. Date: Jul. 19, 2007

(65) Prior Publication Data
US 2010/0166553 A1    Jul. 1, 2010

(51) Int. Cl.
*F03D 1/06* (2006.01)
*F03D 11/04* (2006.01)
*F03D 11/02* (2006.01)
*F03D 9/00* (2006.01)

(52) U.S. Cl. ............ 416/196 A; 416/197 R; 416/197 A; 416/223 R; 290/55

(58) Field of Classification Search .................. None
See application file for complete search history.

(56) References Cited

U.S. PATENT DOCUMENTS

| | | | | |
|---|---|---|---|---|
| 589,946 | A | * | 9/1897 | Grunow ...................... 416/187 |
| 3,645,694 | A | * | 2/1972 | Flatau ......................... 436/104 |
| 3,924,966 | A | * | 12/1975 | Taminini ..................... 416/177 |
| 4,159,191 | A | * | 6/1979 | Graybill ........................ 416/11 |
| 4,364,709 | A | * | 12/1982 | Tornquist ................. 416/132 B |
| 4,382,191 | A | * | 5/1983 | Potter ........................... 290/55 |
| 5,246,342 | A | * | 9/1993 | Bergstein ................. 416/197 A |
| 5,800,123 | A | * | 9/1998 | Travor ........................... 416/85 |
| 6,428,275 | B1 | * | 8/2002 | Jaakkola ...................... 416/176 |
| 7,098,553 | B2 | * | 8/2006 | Wiegel et al. ................. 290/55 |
| 7,132,760 | B2 | * | 11/2006 | Becker .......................... 290/55 |
| 7,344,353 | B2 | * | 3/2008 | Naskali et al. ................ 415/4.2 |
| 2008/0095631 | A1 | * | 4/2008 | Bertony .................... 416/197 A |

* cited by examiner

Primary Examiner — Scott B Geyer
(74) Attorney, Agent, or Firm — Egbert Law Offices PLLC

(57) ABSTRACT

The invention relates to a wind generator for generating power thanks to the force of the wind or a stream of water. The invention includes a rotor provided with 2, 3 or 4 semi-frustoconical twisted blades practically parallel to the rotation axis, which is horizontal. It is silent, starts with a low-speed wind and can operate in very strong winds. It requires a very short mast, thereby considerably reducing the visual impact on the countryside and the environmental disturbance. It may be intended for dwellings, individual houses, ships, caravans, but also for agricultural uses or any other applications requiring electric power or the like.

12 Claims, 7 Drawing Sheets

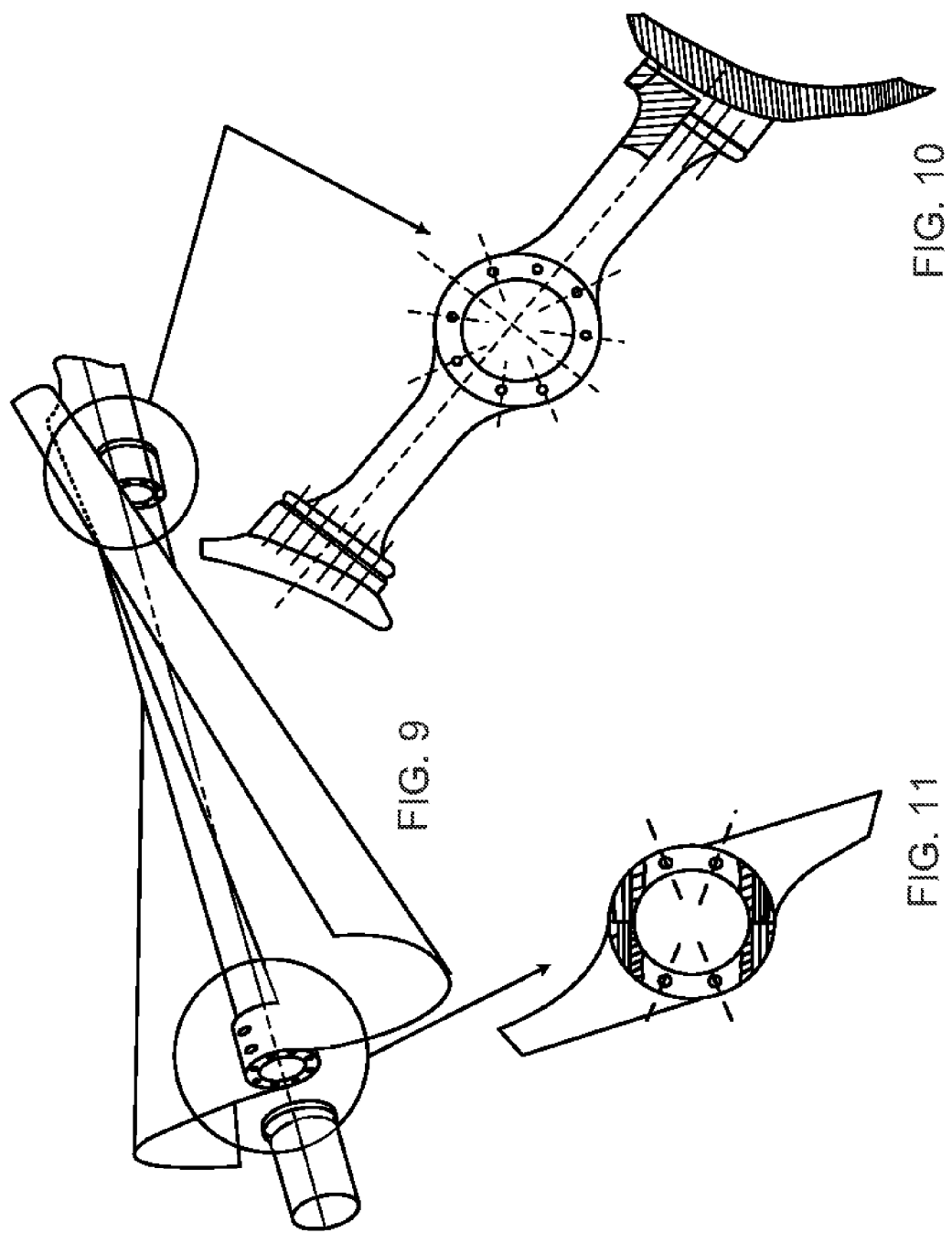

HORIZONTAL-AXIS WIND GENERATOR

CROSS-REFERENCE TO RELATED U.S. APPLICATIONS

The present invention claims priority from PCT Application Serial No. PCT/FR2006/000068, filed on Jan. 12, 2006, and entitled "Horizontal-Axis Wind Generator".

STATEMENT REGARDING FEDERALLY SPONSORED RESEARCH OR DEVELOPMENT

Not applicable.

NAMES OF PARTIES TO A JOINT RESEARCH AGREEMENT Not applicable.

REFERENCE TO AN APPENDIX SUBMITTED ON COMPACT DISC

Not applicable.

BACKGROUND OF THE INVENTION

1. Field of the Invention

The present invention concerns a horizontal axis-wind generator.

2. Description of Related Art Including Information Disclosed Under 37 CFR 1.97 and 37 CFR 1.98.

Traditionally wind generators are equipped with a rotor consisting of blades that are perpendicular to the transmission shaft. These blades generate constraints, including:
 ceasing to operate at high wind speeds;
 changing the landscape due to their imposing structure;
 interfering with the environment; and
 creating annoying noise.

BRIEF SUMMARY OF THE INVENTION

The device according to the invention permits to remedy these inconveniences or to reduce these constraints. The present invention allows:
 operation at high wind speed and start-up at low wind speed;
 limitation of the visual impact on the landscape;
 limitation of interference with the environment; and
 no noise annoyance.

The device according to the invention transforms the kinetic energy of wind into mechanical energy. Thus, the mechanical energy of the rotor can be transformed into electric energy (after coupling with an electric generator). The invention may be exploited as a hydraulic turbine by immerging the rotor in a mass of moving water. It may be exploited on a principle of a propelling tide or a hydro-electric power station. The rotor blades may be composed of any type of material (metals, composite, wood . . . ).

BRIEF DESCRIPTION OF THE SEVERAL VIEWS OF THE DRAWINGS

The description and drawings present and illustrate the invention.

FIGS. 5-9 are schematic views of the present invention.
FIGS. 10-11 are sectional views of the present invention.

DETAILED DESCRIPTION OF THE INVENTION

Figure 1:
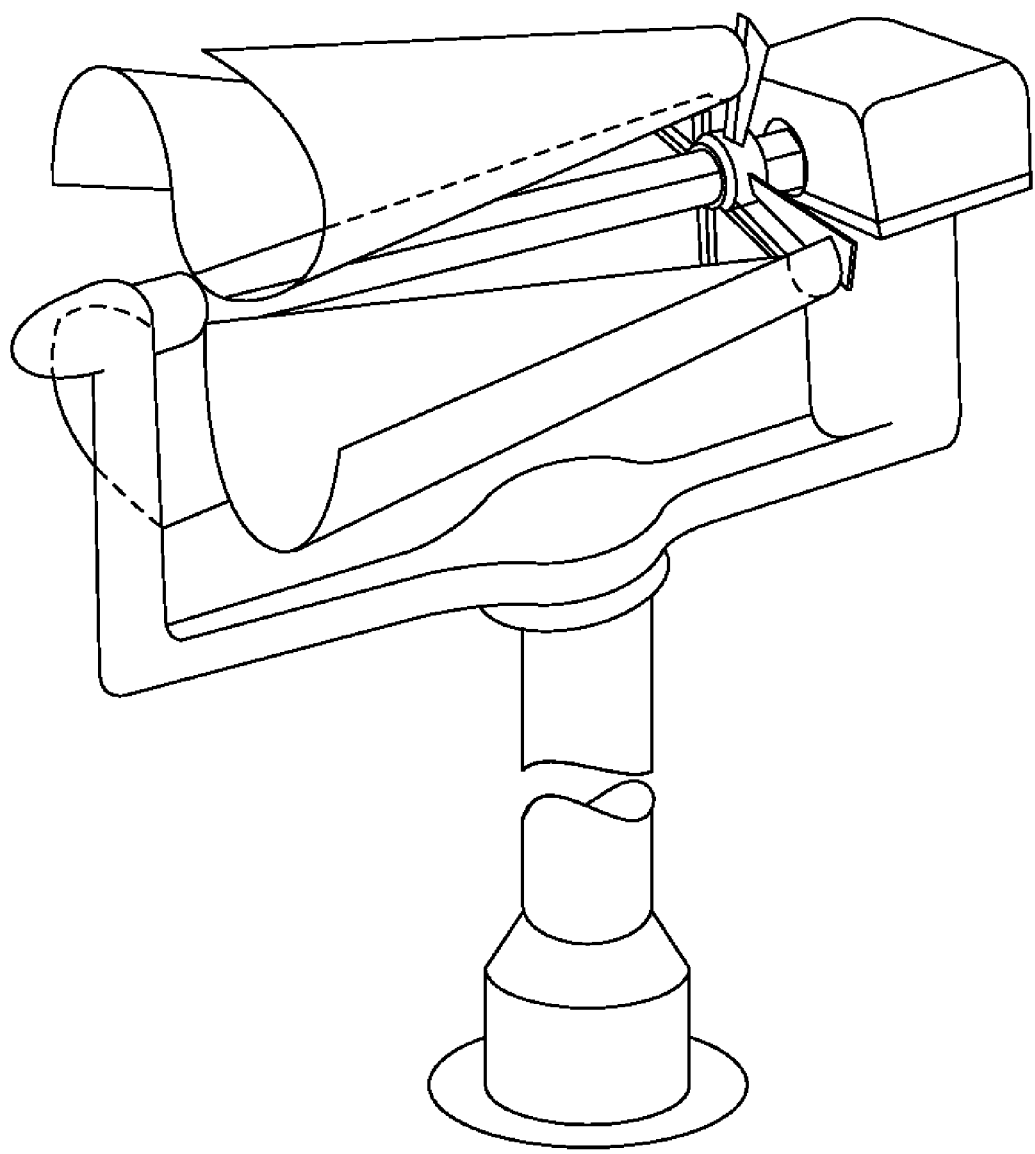
FIGS. 1-4 are perspective views of the present invention.
Figure 2:
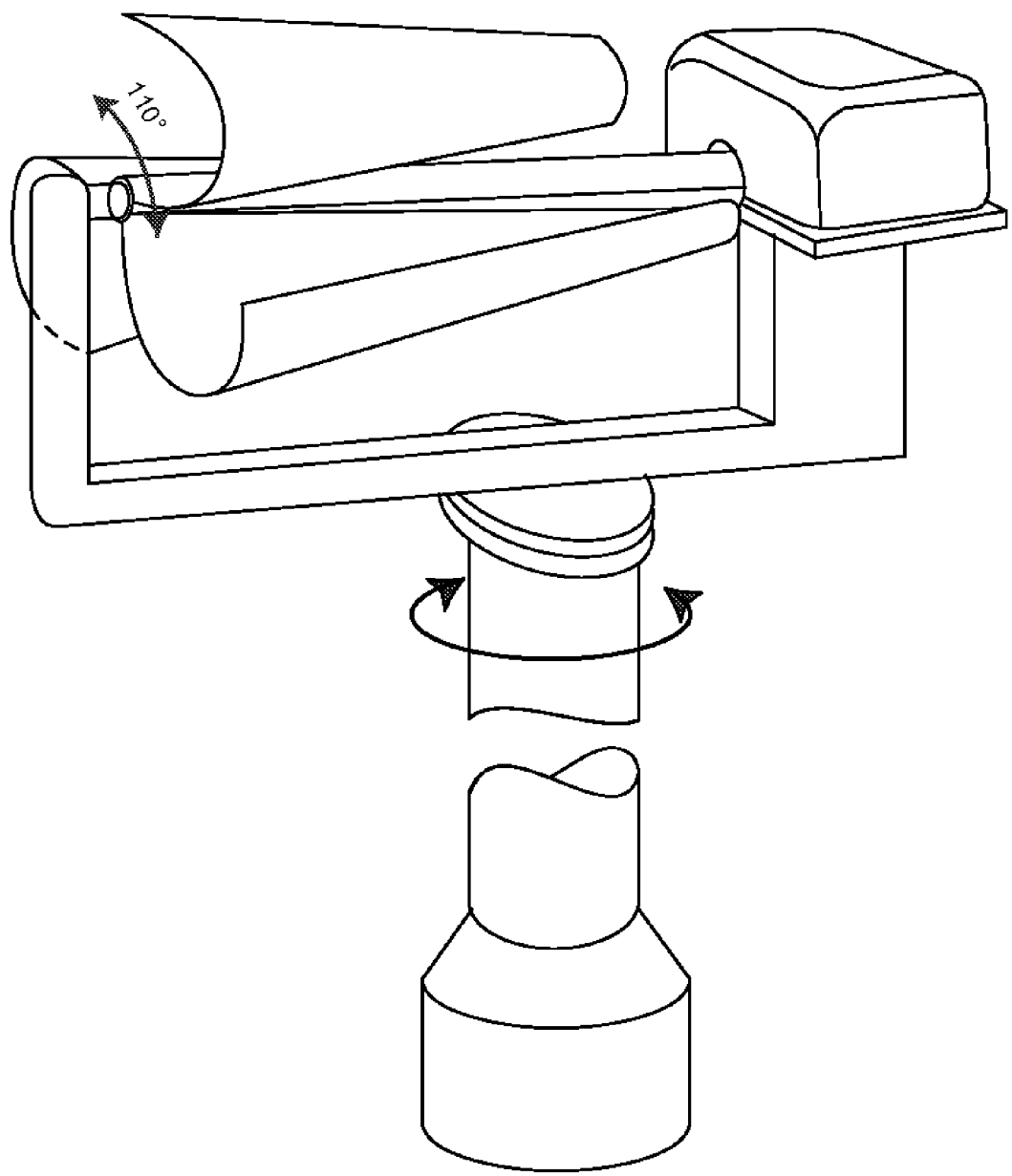
Figure 3:
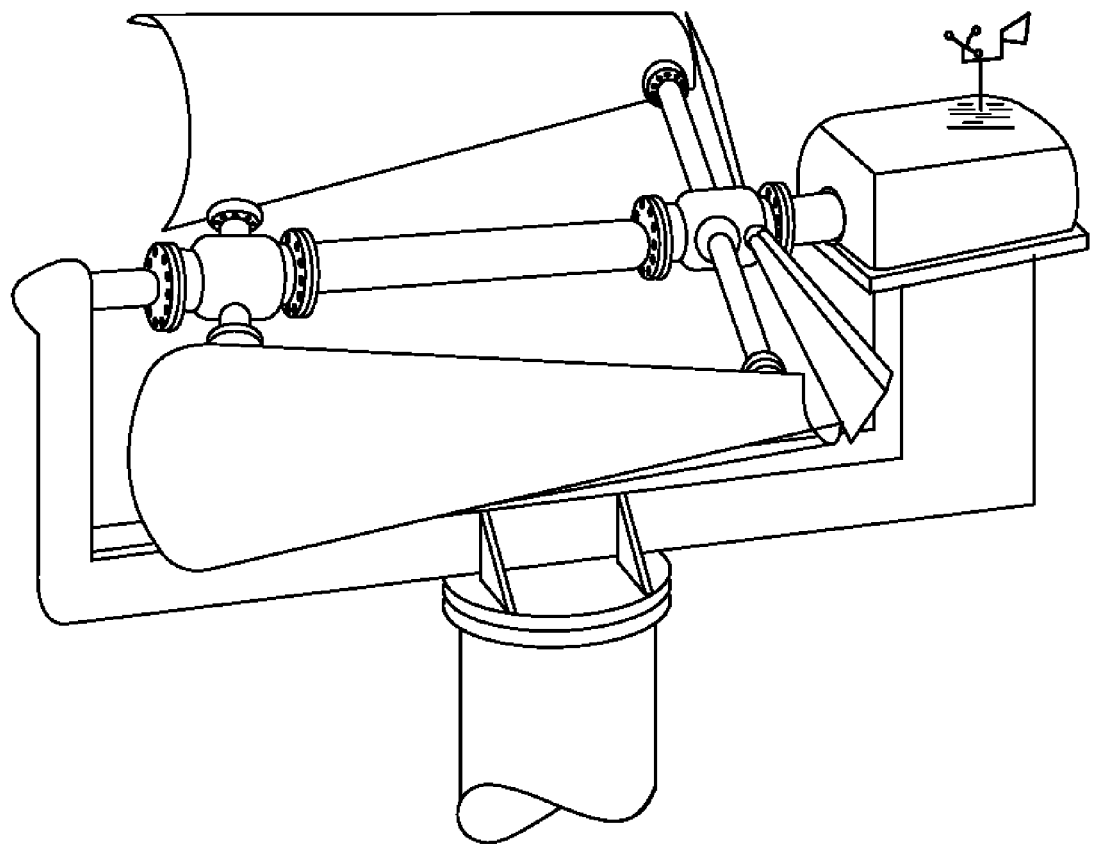
Figure 4:
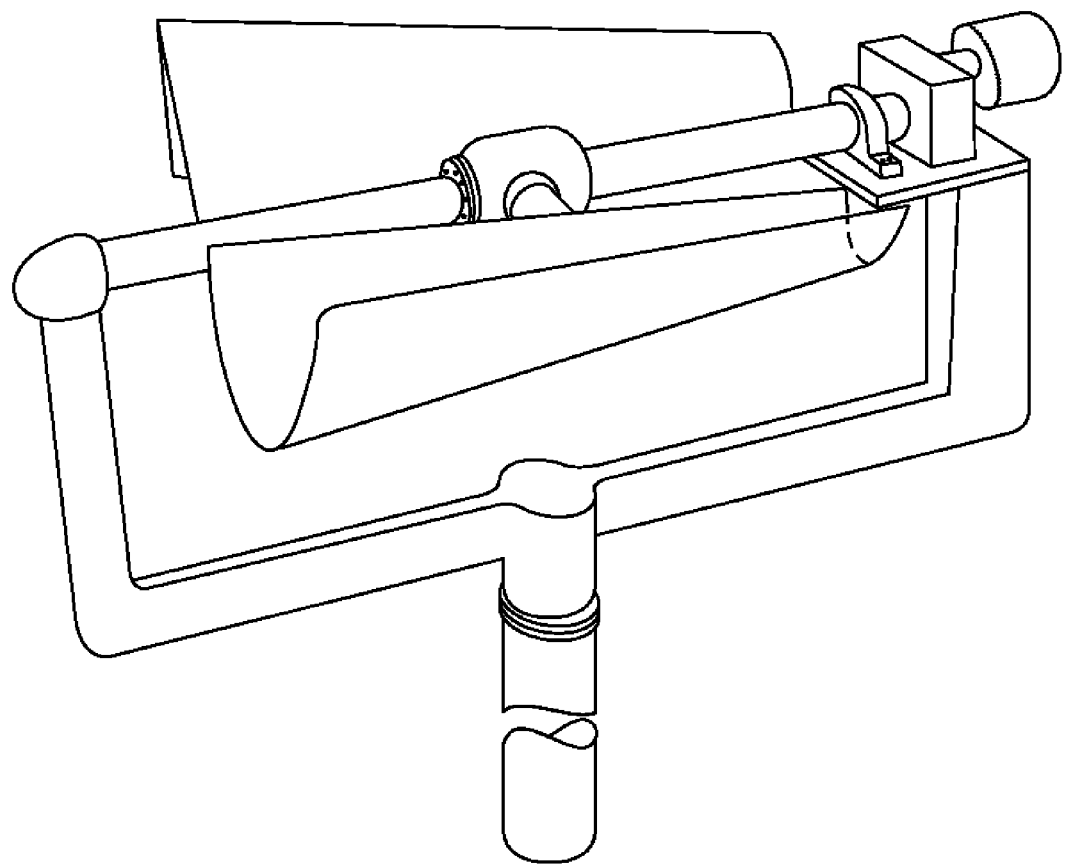
Figure 5:
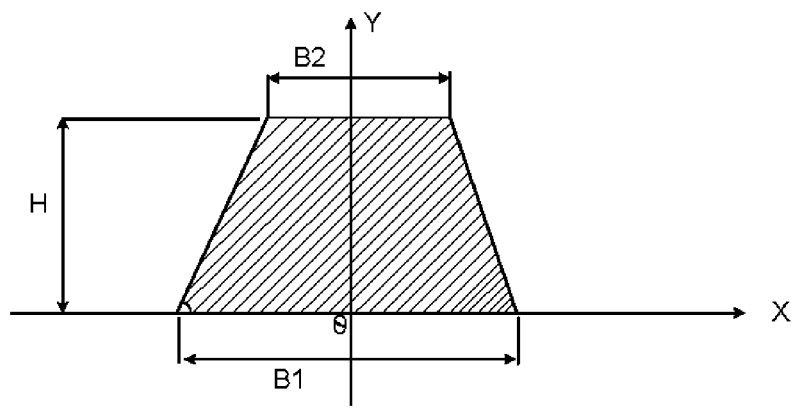
Figure 6:
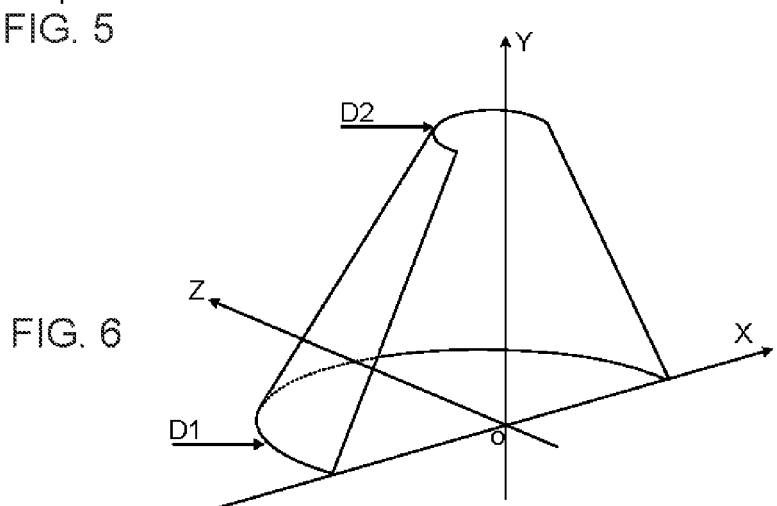
Figure 7:
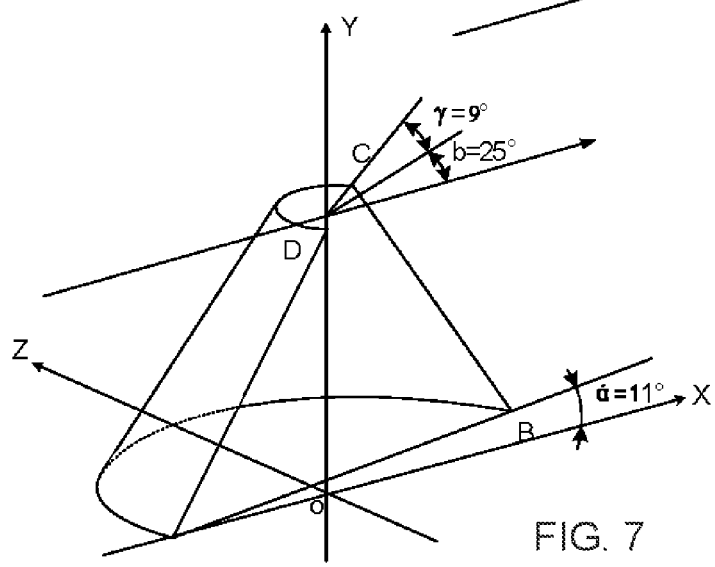
Figure 8:
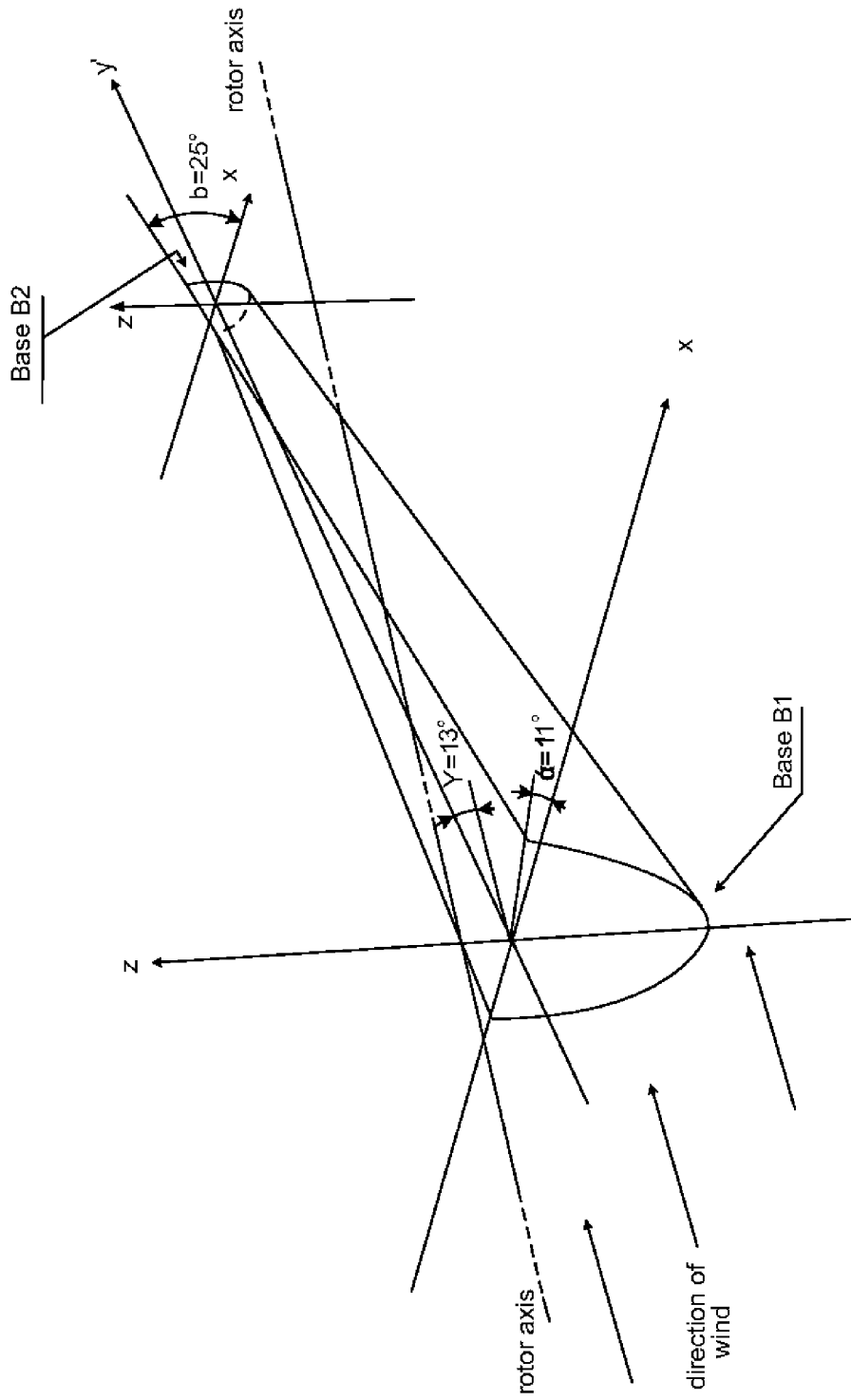

The invention is a horizontal axis-wind generator which positions itself in the wind direction and which consists of a rotor equipped with semi-truncated twisted blades that are quasi-parallel to the axis of rotation of a pod, a mobile structure or a mast supporting the rotor/pod/mobile structure assembly.

The rotor may consist of two, three or four blades and may be assembled on a transmission shaft or an axis of rotation (drawings 1,2,3,4).

This paragraph describes the shape and the spatial configuration of the blade (drawing 6). The shape of the blade according to the invention is semi-truncated (drawings 1,2,3,4,5,6,7).

The expression of the ratio of the blade dimensions is as follows:
 For a given height H of the truncated cone:
  The diameter of the base: $D1=0.25 \times H$
  The diameter of the top end: $D2=0.083 \times H$
It is considered that this blade is positioned in space in relation to the markers (x, y, z)—(drawings 5, 6).

The top B2 with diameter D2 (the smallest side of the semi-trunk) B2 of diameter D2 is oriented around the axis of revolution (y) with a twisted angle $\beta$ between 20° and 30°, and this in relation to the base (the largest side of the semi-trunk) B1 with diameter D1.

This results in an inclination of the base B1 with an angle $\alpha=11°$ and of the base B2 with an angle $\gamma=9°$ and this in the plane (x, y) (drawing 6).

The blade presents an inclination angle $\psi$ (psi) between 10° and 16° in relation to the axis of rotation of the rotor (drawing 6).

If this inclination is in a diagram, the axis of the transmission shaft called (R) can be considered. If for instance the rotor consists of two or four blades, these are diametrically opposed on the transmission shaft (or the axis of rotation), (drawings 1, 3, 4).

If for instance the rotor consists of 3 blades, these are oriented at an angle of 120° to each other (drawing 2).

The blade is fastened at two points to the transmission shaft. The attachments are assured by flanging on two hubs that are integral with the transmission shaft (drawing 7).

The flange at the base B1 is directly attached to the hub.

The flange at base B2 is mechanically integral with the rear hub through a tubular stiffener.

At the rear end of each blade (heading into the wind) is a speed regulator vane (drawing 3). This vane has two functions:

First, it allows regulating the rotational speed of the rotor by varying its angle of incidence. The angle is defined as between the vane and the axis of rotation of the rotor. It is assumed that the maximum wind speed is (x) m/s. As long as the wind speed evolves between 2 m/s and (x) m/s, the speed-regulating vanes maintain their position ensuring the exploitation of the kinetic energy of the wind at the blade exit.

Once the wind speed is above or equal to (x) m/s the vanes orient themselves so as to reduce the rotational speed of the rotor.

The stronger the wind blows the more the vane reduces its angle of inclination in relation to the wind direction.

Second, it serves as a secondary blade, for the purpose of exploiting the kinetic energy of the wind at the blade exit. The rotor assembly is supported by two bearings at each end of the transmission shaft (drawings 2 and 3).

These bearings are mechanically fastened on a U-shaped mobile supporting structure. This mobile supporting structure is attached to a mast.

An orientation system of the supporting structure/rotor assembly is attached to the top of a mast.

The base of the mast is provided with a pedestal fastened to a socle of reinforced concrete.

The invention claimed is:

1. A wind energy generator apparatus comprising:
   a mast;
   a movable structure rotatably mounted at a top of said mast; and
   a rotor positioned on said mobile structure, said rotor having a plurality of semi-truncated cone-shaped blades, said rotor having an axis of rotation about which said plurality of semi-truncated cone-shaped blades rotates, each of said plurality of semi-truncated cone-shaped blades having an angle of inclination of between 10° and 16° in relation to said axis of rotation, each of said plurality of semi-truncated cone-shaped blades having a cone trunk having a height dimension and a base having a diameter dimension and a top having a diameter dimension, said base having said dimension equal to 0.25 times said height dimension, said top having said diameter dimension equal to 0.083 times said height dimension.

2. The wind energy generator apparatus of claim 1, said axis of rotation being horizontal.)

3. The wind energy generator apparatus of claim 1, said plurality of semi-truncated cone-shaped blades being two blades.

4. The wind energy generator apparatus of claim 3, said two blades being diametrically opposed to each other about said axis of rotation.

5. The wind energy generator apparatus of claim 1, said plurality of semi-truncated cone-shaped blades being four blades.

6. The wind energy generator apparatus of claim 5, two blades of said four blades being diametrically opposed to each other about said axis of rotation, another two blades of said four blades being diametrically opposed to each other about said axis of rotation.

7. The wind energy generator apparatus of claim 1, said plurality of semi-truncated cone-shaped blades being three blades.

8. The wind energy generator apparatus of claim 7, said three blades being oriented 120° in relation to each other.

9. The wind energy generator apparatus of claim 1, said plurality of semi-truncated cone-shaped blades being oriented around said axis of rotation with a twisting angle of between 20° and 30° relative to said diameter dimensions of said base.

10. The wind energy generator apparatus of claim 1, said base having an angle of inclination equal to 11°.

11. The wind energy generator apparatus of claim 1, said top having an angle of inclination equal to 9°.

12. The wind energy generator apparatus of claim 1, each of said plurality of semi-truncated cone-shaped blades having a speed-regulating vane at a rear end thereof.

* * * * *